Patented Nov. 18, 1941

2,263,010

UNITED STATES PATENT OFFICE 2,263,010

CHLORINATED KETONES

Emil J. Rahrs, Rochester, N. Y., assignor to Eastman Kodak Company, Rochester, N. Y., a corporation of New Jersey No Drawing. Application December 1, 1938, Serial No. 243,374

5 Claims. (Cl. 23—250)

This invention relates to treatment for improving chlorinated ketones which normally tend to deteriorate upon standing or storage and more particularly to the treatment of chloracetones, such as monochloracetone to obtain a product which does not materially deteriorate during storage.

Chlorinated acetones have been prepared in a number of ways. However, the difficulty arises that when chloracetone is stored, in many instances it starts to turn dark in a few days time. At the end of a few weeks or a month the liquid becomes very dark. At still a greater length of time the product may change to a black, viscous, tarry mass. Hence, it has been necessary in many instances either to prepare the chlorinated acetone immediately prior to its use, or redistill the product frequently. It has also been proposed to seal the liquid in dark colored containers and add various constituents thereto such as hydroquinone, diphenylamine, isoamyl nitrate or the like.

I have found that the aforementioned difficulties may be overcome and that relatively large quantities of chloracetone may be prepared and stored. At the end of the storage period the chloracetone treated in accordance with my invention described in detail herein, was in all instances in relatively satisfactory condition.

This invention has for one object to provide a treatment which improves chlorinated ketones such as, for example, chloracetones which normally tend to deteriorate upon standing. Still another object is to provide a preliminary treatment which renders stabilization treatment more effective. Another object is to provide novel procedure for storing my chlorinated acetones. A still further object is to provide a monochloracetone which is capable of storage for extended periods without deterioration thereof.

I have found that chlorinated ketones and in particular chloracetones which normally tend to darken and finally deteriorate to viscous, tarry masses, may if desired, be subjected to a preliminary treatment and finally treated with a carbonate such as calcium carbonate, thereby obtaining a product capable of storage for an indefinite period without deterioration. For a more complete understanding of my invention, reference is made to the following examples which are set forth primarily for the purpose of illustrating my preferred embodiment and not to be construed as limiting my invention.

Chlorinated ketones from various methods of manufacture may be treated by my process. However, by applying my novel purification treatment in conjunction with the stabilization treatment to a well-prepared chlorinated ketone appears to produce the best product.

However, as indicated, chlorinated acetone, which tends to deteriorate upon standing, may be obtained from any source. Preferably, the ketone would be in a more or less freshly prepared condition. In this way, difficulties due to contamination from polymerization products already formed and the like, would be minimized. Such freshly prepared chlorinated ketone, and in the particular instance under discussion, essentially comprising monochloracetone, was neutralized with a saturated solution of a weak alkali, litmus being used as an indicator. Sodium bicarbonate is a satisfactory alkali, whereas ammonium hydroxide, for example, would not be employed. After this neutralization treatment the chloracetone is stirred with a hygroscopic salt such as calcium chloride. The chloracetone layer resulting may be poured off and further treated. To the chloracetone from either of these steps is added a small amount of calcium carbonate.

Or, in place of or supplemental to the preceding treatment, chloracetone may be mixed with calcium carbonate and distilled under reduced pressure.

While I may treat chlorinated ketones from various sources with calcium carbonate, barium carbonate or other carbonates, to obtain a product capable of storage for an indefinite period, for a product particularly resistive to deterioration I prefer to prepare the chloracetone as follows:

Vaporous acetone is fed into a reaction chamber substantially simultaneously with the introduction of chlorine. By means of cooled or heated conduits, as conditions may require, positioned above and below the reaction chamber, the reaction is operated so that the chlorinated ketone formed immediately flows out of the reaction chamber to a receiver. In flowing from the reaction chamber, the chlorinated acetone is passed through a heated conduit which causes the stripping out of unreacted acetone, chlorine, etc., thereby delivering to the receiver chlorinated acetone more or less free of these constituents.

The cooled conduits positioned above the reaction chamber and in communication therewith, function to condense out chlorinated hydrocarbon, acetone and the like which may be carried out with the escaping hydrogen chloride. By employing a chlorine feed which merely gives a slight greenish tinge to the reaction chamber, namely, a quantity of chlorine not greatly in excess of the acetone, relatively large yields of monochloracetone may be obtained. As indicated, the chlorinated acetone is collected in a receiver.

This crude chloracetone was subjected to the preliminary purification comprising neutralization with sodium bicarbonate, litmus being used as the indicator. Thereafter the chloracetone was agitated with calcium chloride and the chloracetone layer poured off and subjected to further treatment with calcium chloride.

The chloracetone from this latter treatment was mixed with approximately 1% by weight of calcium carbonate. This mixture was distilled under slightly reduced pressure in a still having a water-cooled still head and the product collected in a water-cooled receiver. The chloracetone collected as the head product was further distilled and a cut boiling between 117–120° C. collected. This cut essentially comprised monochloracetone.

This chloracetone fraction from the aforementioned preliminary treatment was then further treated with a small amount of calcium carbonate. It was found that this chloracetone did not materially change even after long periods of storage.

In accordance with the following example, a crude dichloracetone was obtained. Dichloracetone may be prepared in accordance with the procedure already described. Supplying larger quantities of chlorine to the reaction tends to cause the production of the dichloracetone. The crude chloracetone was fractionated as described and the residue of the fractionation essentially comprised dichloracetone. This dichloracetone was distilled in the presence of calcium carbonate and distilled chloracetone stored in the presence of a small amount of calcium carbonate. It was likewise found that this dichloracetone which had been treated with the calcium carbonate did not materially change, even after an extended period of storage.

It is therefore apparent from the preceding examples, that chloracetones which normally tend to deteriorate upon storage, may be treated with carbonates to obtain a product resistant to such deterioration. In most instances I would prefer to subject the crude chloracetone to a distillation treatment in the presence of calcium carbonate and thereafter adding a small amount of calcium carbonate to the distilled product prior to the storage thereof. Also, as indicated, the further preliminary steps of neutralization and drying with a salt such as calcium chloride, as described, assist in rendering the carbonate step more effective. I have found, however, that the utilization of the various carbonates such as barium, strontium, calcium and the like, at one or more points in the preparation of chloracetone, produces a chloracetone more resistant to deterioration upon storage. I prefer to employ calcium carbonate inasmuch as this is relatively economical and readily obtainable, and store the chloracetone in contact therewith.

Relatively small amounts of the calcium carbonate, as for example 1 to 6 grams of calcium carbonate added to 100 grams of chloracetone would be sufficient. However, a surplus causes no injury and may be added if desired.

Chloracetone treated in accordance with my invention, even after several months' storage was satisfactory for use without redistillation. If desired, the chloracetone in accordance with my invention, may be stored in colored containers as, for example, amber colored glassware, but this is not necessary.

Therefore, it is apparent from the foregoing that my invention is susceptible of some modification. Hence, I do not wish to be restricted, excepting insofar as is necessitated by the prior art and the spirit of the appended claims.

What I claim and desire to be secured by Letters Patent of the United States is:

1. The method of treating a freshly prepared chloracetone fraction boiling within the temperature range of 117° C.–120° C., which comprises treating said chloracetone with a small amount of an alkaline earth metal carbonate.

2. A composition of matter essentially comprising chloracetone having a small content of alkaline earth metal carbonate incorporated therewith.

3. A composition of matter essentially comprising monochloracetone having a small content of calcium carbonate.

4. A composition of matter essentially comprising at least one chlorinated ketone having a small content of alkaline earth metal carbonate incorporated therewith.

5. The method of treating a freshly prepared chlorinated ketone which comprises treating said ketone with at least a sufficient amount of an alkaline earth metal carbonate to prevent deterioration during storage.

EMIL J. RAHRS.